US008695932B1

(12) United States Patent
Balsis, III

(10) Patent No.: US 8,695,932 B1
(45) Date of Patent: Apr. 15, 2014

(54) REMOVABLE VEHICLE SEAT SUPPORT

(71) Applicant: Bernard Alphonsus Balsis, III, Sponaway, WA (US)

(72) Inventor: Bernard Alphonsus Balsis, III, Sponaway, WA (US)

(*) Notice: Subject to any disclaimer, the term of this patent is extended or adjusted under 35 U.S.C. 154(b) by 0 days.

(21) Appl. No.: 13/651,880

(22) Filed: Oct. 15, 2012

(51) Int. Cl.
*F16M 11/24* (2006.01)
(52) U.S. Cl.
USPC .................. 248/188.2; 248/170; 296/65.03; 297/130; 297/440.22
(58) Field of Classification Search
USPC ............. 296/65.03; 297/130, 256, 440.22; 248/170, 440, 188.2, 188.6; 280/35, 280/79.2
See application file for complete search history.

(56) References Cited

U.S. PATENT DOCUMENTS

| 2,537,909 | A | * | 1/1951 | Puddester | 188/5 |
| 3,702,204 | A | * | 11/1972 | Tipton | 297/248 |
| 4,588,225 | A | * | 5/1986 | Sakamoto | 297/344.14 |
| 5,362,125 | A |  | 11/1994 | Peak |  |
| 5,911,465 | A |  | 6/1999 | Yamamoto et al. |  |
| 6,010,296 | A |  | 1/2000 | Enders |  |
| 6,345,864 | B1 | * | 2/2002 | Rivera et al. | 297/130 |
| 6,478,267 | B1 |  | 11/2002 | Whitman et al. |  |
| 6,929,328 | B1 | * | 8/2005 | Snyder | 297/463.1 |
| 7,487,981 | B2 | * | 2/2009 | Cromie | 280/79.11 |
| 7,798,550 | B2 |  | 9/2010 | Stefanon |  |
| 8,424,946 | B2 | * | 4/2013 | Newberg et al. | 296/65.03 |
| 2003/0122407 | A1 |  | 7/2003 | Boyd et al. |  |
| 2006/0232034 | A1 | * | 10/2006 | Skiles | 280/79.2 |

* cited by examiner

Primary Examiner — Bradley Duckworth
(74) Attorney, Agent, or Firm — Goldstein Law Offices, P.C.

(57) ABSTRACT

A removable vehicle seat support for converting a removable seat into stand-alone seating. The supports have a rail with a plurality of legs and a plurality of latch pins. In one embodiment, the legs are selectively collapsible. In a further embodiment, the latch pins are selectively adjustable. A plurality of latches on a frame bottom of a removed seat directly engages the support latch pins, connecting the seat frame to the support and forming stand-alone seating. The supports sufficiently elevate the seat off the floor so that the seating is at a comfortable height, stabilizing the seating under a user's weight and movement. The supports elevate the seat off the ground, keeping the frame bottom dry and clean when the seating is used for outdoor activities such as camping and tailgating. The supports are portable and the seating is easy to set up, stable and comfortable.

14 Claims, 5 Drawing Sheets

REMOVABLE VEHICLE SEAT SUPPORT

TECHNICAL FIELD

The present disclosure relates generally to a removable vehicle seat support. More particularly, the present disclosure relates to a removable vehicle seat support for converting a removable seat to stand-alone seating.

BACKGROUND

Many sport utility vehicles, such as JEEP® WRANGLER® brand (JEEP® and WRANGLER® are the registered trademark of the Chrysler Group LLC of Auburn Hills, Mich.) vehicles, passenger vans, and mini-vans have removable seating. Many are bench-style seats, but some are individual chairs. Most owners remove their rear seat, folding it up and stowing it to make some cargo space. While stowed folded up, the seat is useless, collecting dust and taking up space in a garage or living space that could be better used.

Many have proposed ways to better remove and stow rear seats but limit the utility of the seat once it is removed.

While these proposals may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a support for converting a removable vehicle seat into stand-alone seating that is useful in a plurality of vehicle brands. Accordingly, an aspect of an example embodiment in the present disclosure provides a support having a plurality of latch pins selectively sliding along the support to a position opposite a latch and engaging the latch on a seat frame bottom, securing the support to the seat frame.

Another aspect of an example embodiment in the present disclosure is to provide a support for converting a removable vehicle seat into stand-alone seating that is compact and portable. Accordingly, an aspect of an example embodiment in the present disclosure provides a support for converting a removable vehicle seat into stand-alone seating having a pair of legs extending outward from the support forming a right angle, supporting the seat and folding towards the rail for stowing in the opening between the tracks, the support substantially flat, portable and compact for easy storage.

A further aspect of an example embodiment in the present disclosure is to provide a support for converting a removable vehicle seat into stand-alone seating that does not sink into a soft surface. Accordingly, an aspect of an example embodiment in the present disclosure provides a support for converting a removable vehicle seat into stand-alone seating that has plurality of legs, each leg with a bottom, the bottom of the leg having a flat shoe to prevent the leg from sinking into a soft surface.

Yet another aspect of an example embodiment in the present disclosure is to provide a support for converting a removable vehicle seat into stand-alone seating that raises the seat to a comfortable height for sitting when the seat is standing alone. Accordingly, an aspect of an example embodiment in the present disclosure provides a support for converting a removable vehicle seat into stand-alone seating that has plurality of legs, each leg having a height to raise the seat about 16 to 20 inches above a surface, preferably to raise the seat about 18 inches above a surface.

The present disclosure describes a support for converting a removable vehicle seat into stand-alone seating. The seating is underpinned by a plurality of supports, each with a rail having a pair of legs and a plurality of latch pins. In one embodiment, the legs are selectively collapsible legs. In a further embodiment, the latch pins are selectively adjustable. A plurality of latches on a frame bottom of a removed vehicle seat directly engages the latch pins on the support, connecting the frame to the support and forming stand-alone seating. The supports sufficiently elevate the seat off the floor so that the seating is at a comfortable height for a plurality of users. The supports stabilize the seating under the weight and movement of a user. The supports elevate the seat off the ground, keeping the frame bottom dry and clean when the seating is used for outdoor activities such as camping and tailgating. When used outdoors, the legs each have a bottom foot with a shoe to prevent the seating from sinking into grass, mud or sand. The supports are portable and the seating is easy to set up, stable and comfortable.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
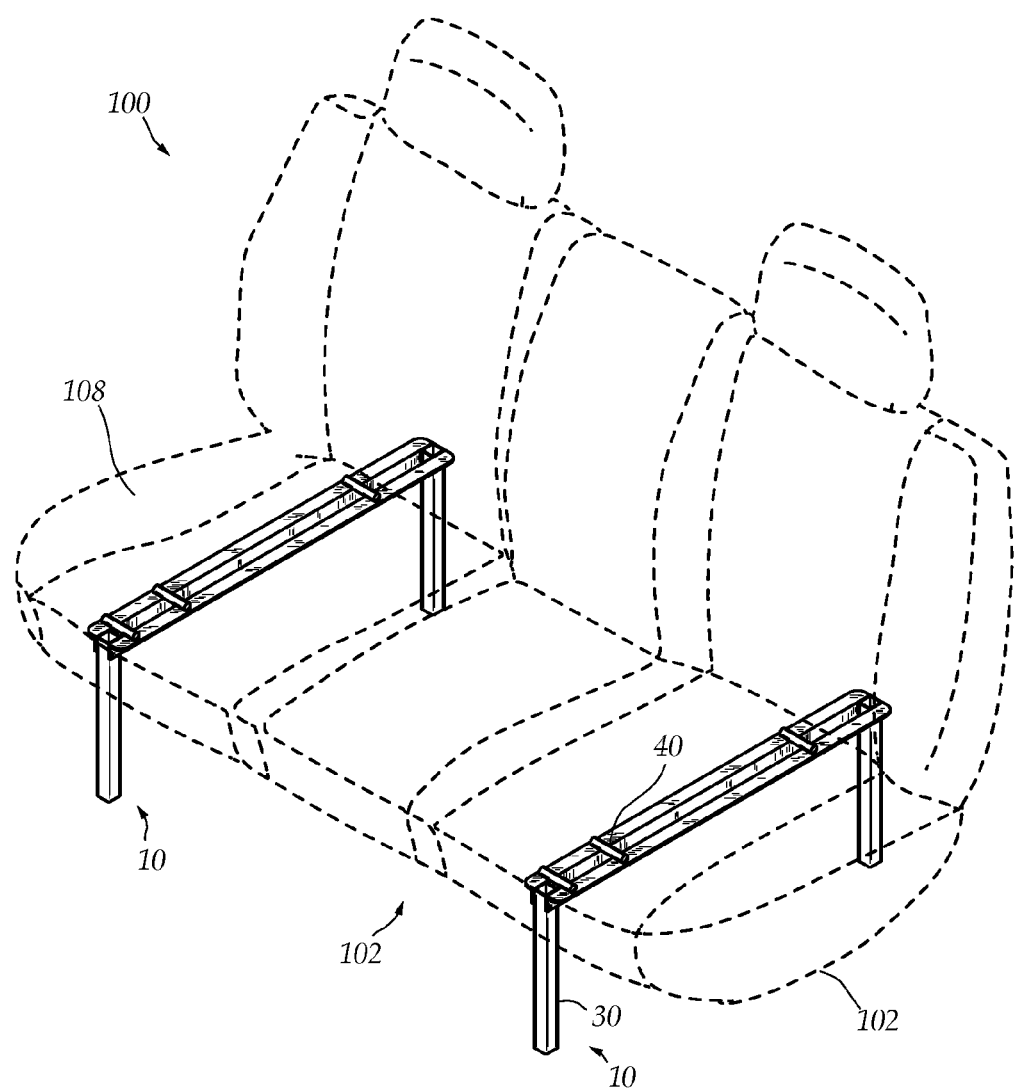
FIG. 1 is a diagrammatic perspective view of a pair of removable vehicle seat supports with a removable vehicle seat shown in outline.

FIG. 1 illustrates a system for converting a removable vehicle seat 100 into a stand-alone seating using a pair of removable seat supports 10. The removable seat has been removed from a vehicle such as, for example, not limited to, a JEEP® WRANGLER® and similar sport utility vehicles. The removable seat 100 has a frame bottom 102 and the seat supports securely engage the frame bottom.

Figure 2:
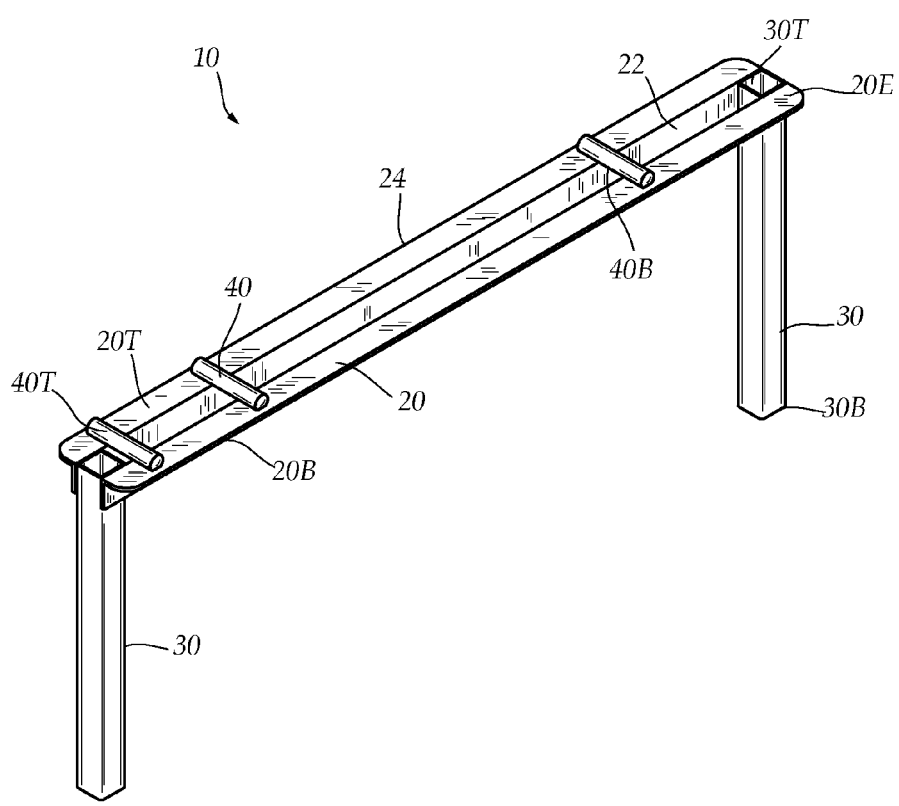
FIG. 2 is a diagrammatic perspective view of a removable vehicle seat support.

Each seat support 10, as illustrated in FIG. 2, has a rail 20, the rail 20 having a bottom 20B and a top 20T and a pair of ends 20E. A pair of legs 30, each having a top 30T and a bottom 30B, attaches at each end 20E of the rail 20, the top of each leg attaching to the bottom 20B of the rail. A plurality of latch pins 40 are on top 20T of the rail for engaging a plurality of latches 104, shown in FIG. 3, on the frame bottom of a removable seat, the engaged latches and latch pins securing the seat to the support.

Referring to FIG. 2, the rail 20 has a pair of parallel tracks 24 with an opening 22 therebetween. The latch pins 40 each having a top 40T and bottom, the latch pins 40 connecting the tracks by straddling the opening 22 such that latches on the frame bottom engage the latch pins fully through the opening 22, the latches enclosing the top and bottom of the latch pins.

Figure 3:
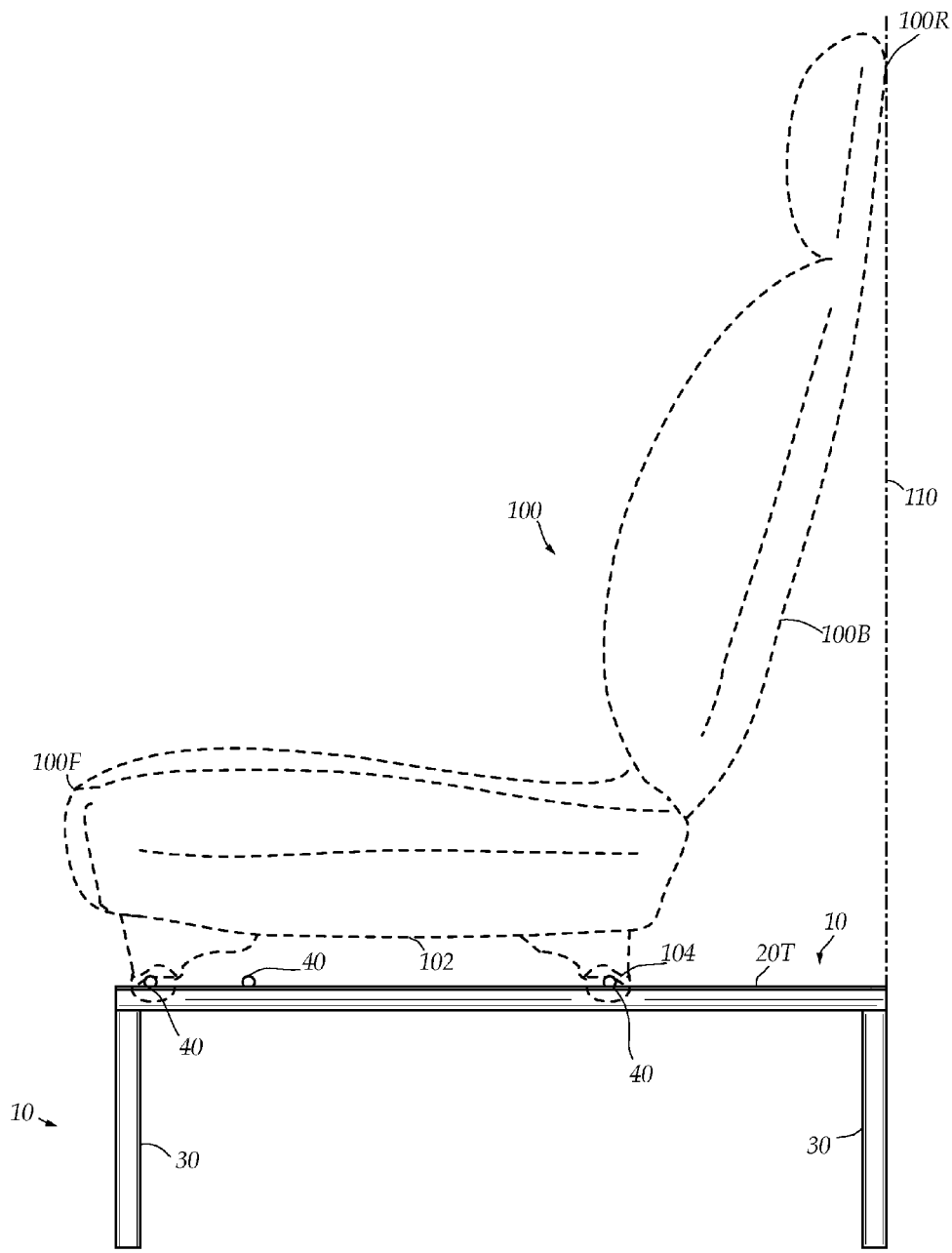
FIG. 3 is a side elevational view of a removable vehicle seat support with a removable vehicle seat shown in outline.

FIG. 3 shows the seat 100 engaging the support 10. The support 10 slides onto the frame bottom 102, and the latch pins 40 engage the latches 104

In one embodiment the latch pins 40 selectively slide along the tracks and lock into a position opposite a position of the latch on the frame bottom, such that the support adapts to different removable vehicle seats. The seat has a back 100B and a front 100F. The rail 20 is of a sufficient length such that the front 100F and back 100G of the seat is supported, having a leg 30 underpinning the front and a second leg supporting the back 100B, such that a plumb line 110 dropped from a rearmost position 100R is underpinned. The system has at least a pair of supports 10 for the seat 100 so that the seating formed by the system is stable, maintaining an upright position when sat on by a user, regardless of weight and movement.

Figure 4:
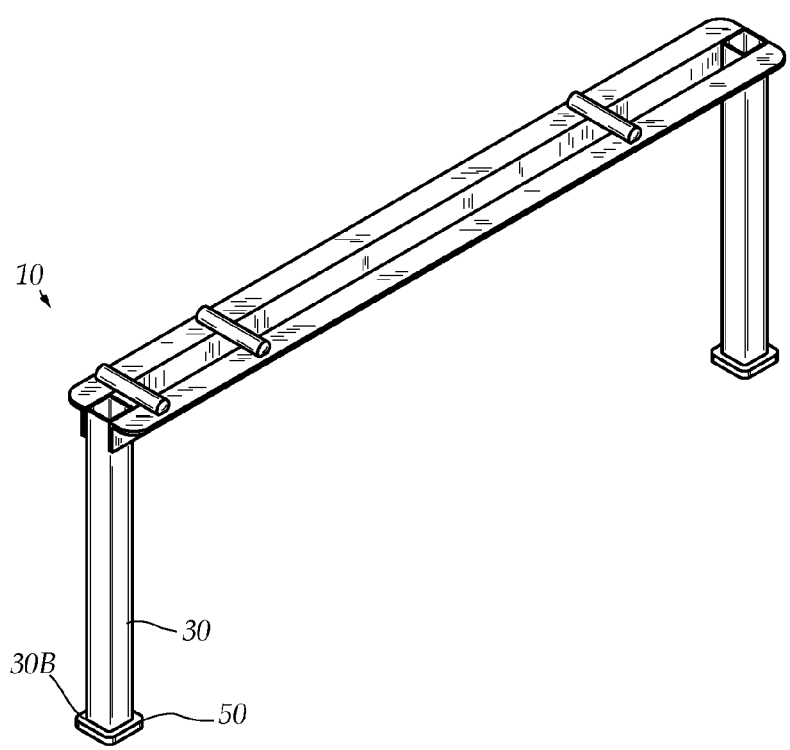
FIG. 4 is a diagrammatic perspective view of a further embodiment of the removable vehicle seat support.

FIG. 4 shows a further embodiment of the support 10. The bottom 30B of each leg 30 has a flat shoe 50 to prevent the legs from sinking into a soft surface. Typically, removable seats are in sport utility vehicles that are used for outdoor activities, such as camping. The shoe 50 allows the seating to be used outdoors on soft surfaces, such as grass or dirt without sinking. In a further embodiment, the shoe is a rubbery material to protect flooring as well as preventing sinking on soft surfaces.

Figure 5A:
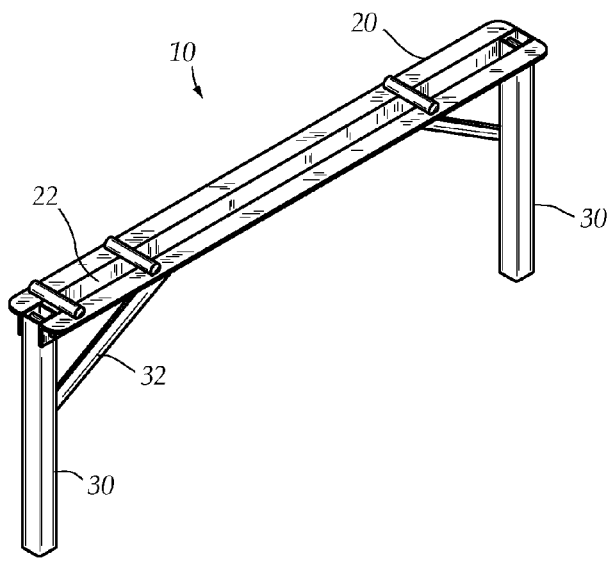
FIG. 5A is a diagrammatic perspective view of a further embodiment of the removable vehicle seat support having a pair of hinged legs, the legs in an extended position.
Figure 5B:
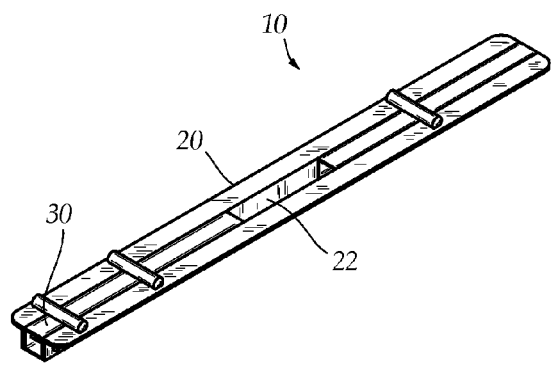
FIG. 5B, similar to FIG. 5A, is a diagrammatic perspective view of a further embodiment of the removable vehicle seat support having a pair of hinged legs, the legs in a collapsed position.

FIG. 5A and FIG. 5B show a further embodiment of the support. The legs 30 are hingedly attached to the rail 20 for easy storing and portability. In this non-limiting illustration, the legs 30 attach using a bar 32 that slides along the opening 22, extending the legs and locking the legs into forming a right angle with the rail 20, as shown in FIG. 5A. In FIG. 5b, the legs retract, folding towards the rail 20, stowing in the opening 22 between the tracks 24, the support 10 substantially flat and compact for easy storage. Other methods of hingedly connecting legs to a frame are well known are within the inventive concept.

Returning to FIG. 1, the legs elevate the removable seat off the ground such that a seat portion 108 is at a comfortable height for sitting by a user, such as an average adult. Typically seat portions are 16 to 20 inches above the surface upon which the seating sits. Seat portions are preferrably about 18 inches above the ground or floor.

To use the system, the user removes the seat 100 from the vehicle, inverts the seat, slides the rails 10 unto the bottom of the seat 102 and turns the seat upright, ready for sitting. In a further embodiment, the user moves the latch pins 40 opposite the latches on the seat bottom before sliding the rails 10 unto the bottom. In another embodiment, the user extends the legs 30 from a retracted position, locking the legs in place before turning the seat upright.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a removable vehicle seat support for converting a removable seat into stand-alone seating. The disclosure is illustrated by example in the drawing figures, and throughout the written description. It should be understood that numerous variations are possible, while adhering to the inventive concept. Such variations are contemplated as being a part of the present disclosure.

What is claimed is:

1. A removable vehicle seat support, for converting a removable seat into a stand-alone seating, the removable seat having a frame bottom with a plurality of latches, comprising:
   a rail, the rail having a bottom and a top and a pair of ends, the rail having a pair of parallel tracks with an opening therebetween;

a pair of legs attaching to the bottom of the rail at each end; and a plurality of latch pins, the latch pins each having a top and bottom, said latch pins on top of said rail for engaging a plurality of latches on a frame bottom of a removable seat, said latch pins straddling the opening of said parallel tracks, said latch pins connecting said tracks said latch pins selectively sliding along the tracks, each latch pin locking into a position opposite a position of the latch on the frame bottom, such that the latches on the frame bottom engage the latch pins fully, the latches enclosing the top and bottom of said latch pins, the engaged latches and latch pins securing the seat to the support.

2. The removable vehicle seat support as described in claim 1, wherein, the leg has a top and a bottom, the bottom of the leg having a flat shoe to prevent the leg from sinking into a soft surface.

3. The removable vehicle seat support as described in claim 2, wherein the leg top is hingedly connected to the rail, the leg extending outward from the rail forming a right angle and folding towards the rail for stowing in the opening between the tracks, the support substantially flat and compact for easy storage.

4. The removable vehicle seat support as described in claim 3, wherein the leg has a height sufficient to raise the seat about 16 to 20 inches above a surface.

5. The removable vehicle seat support as described in claim 4, wherein the leg has a height sufficient to raise the seat about 18 inches above a surface.

6. The removable vehicle seat support as described in claim 5, wherein a plurality of supports engage the seat bottom frame creating a stable seating that supports a user's weight.

7. A system for converting a removable vehicle seat into a stand-alone seating, the removable seat having a frame bottom with a plurality of latches, comprising:

a plurality of rails, each rail having a bottom and a top and a pair of ends, each rail having a pair of parallel tracks with an opening therebetween;

a pair of legs attaching to the bottom of each rail at each end; and a plurality of latch pins, the latch pins having a top and bottom, said latch pins on top of said rail for engaging a plurality of latches on a frame bottom of a removable seat, said latch pins straddling the opening of said parallel tracks, said latch pins connecting said tracks, said latch pins selectively sliding along the tracks, each latch pin locking into a position opposite a position of the latches on the frame bottom, such that the latches on the seat frame bottom engage the latch pins fully, the latches enclosing the top and bottom of said latch pins through the opening, the engaged latches and latch pins securing the seat to the rails.

8. The system for converting a removable vehicle seat into a stand-alone seating as described in claim 7, wherein, the leg has a top and bottom, the bottom of the leg having a flat shoe to prevent the leg from sinking into a soft surface.

9. The system for converting a removable vehicle seat into a stand-alone seating as described in claim 8, wherein the leg top is hingedly connected to the rail, the leg extending outward from the rail forming a right angle and folding towards the rail for stowing in the opening between the tracks, the support substantially flat and compact for easy storage.

10. The system for converting a removable vehicle seat into a stand-alone seating as described in claim 9, wherein the leg has a height sufficient to raise the seat about 16 to 20 inches above a surface.

11. The system for converting a removable vehicle seat into a stand-alone seating as described in claim 10, wherein the leg has a height sufficient to raise the seat about 18 inches above a surface.

12. A removable vehicle seat support, for converting a removable vehicle seat into a stand-alone seating, the removable seat having a bottom with a plurality of latches, comprising:

a pair of parallel tracks forming a rail, the rail having a bottom, a top, and a pair of ends, the pair of tracks having an opening therebetween;

a plurality of latch pins on top of the rail, connecting the tracks, the latch pins each having a position opposing a plurality of latches on a seat bottom, the latch pins engaging the latches on the seat bottom, securing the removable seat to the rail; and a pair of legs, each leg having a top hingedly connected to the bottom of said rail at each end between said pair of parallel tracks, each leg extending outwardly from the rail forming a right angle with the rail such that the support elevates the removable seat above a flat surface, each leg folding towards the rail for stowing in the opening between the tracks such that the support is substantially flat and compact for easy storage.

13. The removable vehicle seat support as described in claim 12, wherein the leg has a height sufficient to raise the seat about 16 to 20 inches above a surface.

14. The removable vehicle seat support as described in claim 13, wherein the leg has a height sufficient to raise the seat about 18 inches above a surface.

\* \* \* \* \*